United States Patent [19]
Ellison

[11] Patent Number: 6,024,328
[45] Date of Patent: Feb. 15, 2000

[54] SATELLITE CONTROL METHOD USING SINGLE SPECIES OF BIPROPELLANT

[75] Inventor: John R. Ellison, Huntington Beach, Calif.

[73] Assignee: Hughes Electronics Corporation, Los Angeles, Calif.

[21] Appl. No.: 08/768,736

[22] Filed: Dec. 18, 1996

[51] Int. Cl.[7] .............................. B64G 1/26; B64G 1/40
[52] U.S. Cl. ...................... 244/169; 244/172; 244/135 R
[58] Field of Search ................................. 244/164, 169, 244/172, 135 R

[56] References Cited

U.S. PATENT DOCUMENTS

| | | | |
|---|---|---|---|
| 4,787,579 | 11/1988 | Smith | 244/169 |
| 4,802,333 | 2/1989 | Smith | 244/169 X |
| 4,923,152 | 5/1990 | Barkats | 244/169 X |
| 5,263,666 | 11/1993 | Hubert et al. | 244/169 X |
| 5,395,076 | 3/1995 | Lichtin et al. | 244/169 |

*Primary Examiner*—William Grant
*Attorney, Agent, or Firm*—Elizabeth E. Leitereg; Terje Gudmestad; Michael W. Sales

[57] ABSTRACT

In a spacecraft that controls its position and attitude by a plurality of bipropellant thrusters, controlled ejection and vaporization of a single remaining propellant species generates a thrust force to adjust the spacecraft's position and attitude, thereby allowing an extension of the spacecraft's useful life after the other propellant has been exhausted.

23 Claims, 6 Drawing Sheets

1

SATELLITE CONTROL METHOD USING SINGLE SPECIES OF BIPROPELLANT

BACKGROUND OF THE INVENTION

1. Field of the Invention

This invention relates to a method for controlling the position and attitude of a satellite to prolong the longevity of satellite operation.

2. Description of the Related Art

Spacecraft propulsion systems normally use an array of bipropellant thrusters that burn a fuel in combination with an oxidizer to provide orbit raising, station keeping and attitude control. A typical thruster rocket for station keeping and/or attitude control is shown in FIG. 1, which includes a fuel tank 2, an oxidizer tank 4 and at least one thruster 6. Numerous thrusters can be included in a single rocket system, with thruster nozzles 8 pointing in different directions but sharing the same fuel and oxidizer tanks. In normal operation, the fuel tank contains a liquid fuel 10 and a helium gas combined with fuel vapor 12, and the oxidizer tank contains a liquid oxidizer 14 and a helium gas combined with oxidizer vapor 16. The helium gas in both tanks provides pressure to urge the liquid fuel and oxidizer out of the tanks. The fuel and oxidizer tanks are connected to the thrusters by respective fuel and oxidizer lines 18 and 20 and controlled by respective fuel and oxidizer isolation valves 22 and 24.

The normal operation of a rocket thruster is illustrated in FIG. 2. The fuel 10 and the oxidizer 14 are injected into a thrust chamber 26 via respective fuel and oxidizer lines 18 and 20. Oxidizer and fuel streams 28 and 30 injected into the thrust chamber are mixed together for combustion at a sufficiently high temperature. The heated gas 32 resulting from the combustion of the fuel with the oxidizer expands through the thruster nozzle 8 to produce a thrust.

The fuel and oxidizer lines, the thrust chamber and the nozzle generally have metallic walls. A heater plate 34 is attached to the metal forming the thrust chamber wall 36 to warm the thruster during non-operation, since the vaporization of fuel and/or oxidizer in the thrust chamber reduces the chamber temperature. Heating is not required during normal rocket propulsion when the fuel and the oxidizer combust in the thrust chamber.

The oxidizer is typically a volatile, relatively high density fluid that comprises approximately 97% Nitrogen tetroxide ($N_2O_4$) and 3% mixed oxides of nitrogen with a freezing point of about 12° F. The fuel is typically monoethylhydrazine (MMH), which is less dense than $N_2O_4$ and has a lower vapor pressure point. A spacecraft rocket thruster requires both propellants, i.e., the fuel and the oxidizer to burn the fuel in the thrust chamber and generate a propulsive force. Mission planning and/or the occurrence of anomalies can lead to situations in which the fuel and the oxidizer are not consumed in proportionate volumes, thereby leaving a residual amount of either the fuel or the oxidizer in one of the propellant tanks near the end of the satellite's useful life. When only one propellant is left, no more propulsive force can be generated by combustion of the propellants.

Rocket thrusters are generally positioned at different locations on the satellite body with thrust nozzles pointed in different directions to position the satellite at a desired location in orbit (station keeping), or to control its orientation in a desired direction (attitude control). A Hughes HS-393 communications satellite that uses such thrusters for station keeping and attitude control is described in *JCSAT*-1

*Propulsion Anomaly*, Hughes Space and Communications Company, 1996. Simplified views of the attitude control and station keeping thrusters of the HS-393 and a similar model, HS-389, are shown in FIGS. 3*a*, 3*b* and 3*c*. FIG. 3*a* is a simplified perspective view of the satellite, comprising a substantially cylindrical body 38 that is spun about its cylindrical axis 40 for stabilization in orbit. A simplified top view of the satellite is shown in FIG. 3*b*. Four canted radial thrusters 42 are positioned on the side surface of the cylindrical body, with one pair pointing in one direction and another pair pointing in an opposite direction. The side surface of the cylindrical body is covered with a solar panel 46, which is cut out at designated locations 48 in FIG. 3*a* to allow the canted radial thruster nozzles to protrude from the side surface. Control of the satellite's longitude (east-west direction) in the geosynchronous orbit is achieved by firing a pair of canted radial thrusters on the same side. The rate of spinning is controlled by firing a canted radial thruster individually or two such thrusters in a diagonal pair.

The satellite also has a plurality of axial thrusters 44, which are fired to control the attitude (or orientation) of the satellite by adjusting the orientation of its spin axis 40. The axial thrusters and the canted radial thrusters each produce a relatively small thrust force of about 22 Newtons (N).

The bottom of the cylindrical satellite body includes a spun shelf 50, a perspective view of which is shown in FIG. 3*c*. Four additional canted radial thrusters 52 with a thrust force on the order of 22 N are provided near the edges of the spun shelf to provide spin stabilization. A cylindrical central thrust tube 54 extends from the center of the spun shelf and terminates in an open ended cone, with two axial thrusters 44 inside the tube and two apogee thrusters 56 outside. The apogee thrusters are used to lift the satellite up from a transfer orbit to the geosynchronous orbit and have a thrust force on the order of 490 N, which is much greater than the thrust force of the axial and radial thrusters.

Another type of geosynchronous satellite, an example of which is a Hughes HS-601 model illustrated in FIG. 4, is stabilized without spinning. FIG. 4 illustrates only a simplified perspective view of the spacecraft without showing its external antennas and solar panels, with which the present invention is not concerned. The satellite body 58 is substantially cubical with six planar surfaces. Two opposite surfaces 60 (one of which is not shown due to the perspective view) each have two east/west thrusters 62 to adjust the longitude of the satellite in geosynchronous orbit. Another pair of opposite surfaces 64 (one of which is not shown due to the perspective view) each have four north/south thrusters 66 positioned near the corners of each surface to adjust the latitude (or inclination) of the satellite. One of the remaining surfaces 68 has four axial thrusters 70 to control the attitude of the satellite by firing one or more of the thrusters. An apogee thruster 72 is positioned at the center of the surface 68 to propel the satellite from a transfer orbit to the geosynchronous orbit. After the satellite is transferred to the geosynchronous orbit, the apogee thruster is disabled.

Regardless of the type of satellite or thruster arrangement, thruster rockets with bipropellant propulsion must have both the oxidizer and the fuel available for combustion so that a thrust force can be produced. The position (latitude and longitude) and attitude of the satellite need to be adjusted in orbit for proper operation. When one of the two propellants is depleted, the rocket can no longer provide the thrust force for adjusting the position and/or attitude.

SUMMARY OF THE INVENTION

In view of the above problems, the present invention provides a propulsive force by a controlled release of only one of the propellant species without combustion to adjust the attitude and/or position of a satellite. A propellant species, which can be either a fuel or an oxidizer, is injected into a thrust chamber in which the propellant is vaporized. The vaporized propellant is released from the thrust chamber to the thrust nozzle in a carefully controlled manner, preferably by a series of repetitive short pulses, to provide a propulsive force in the direction of the nozzle opening. When only one of the propellant species is left near the end of the satellite's useful life, the controlled thrust generated by the remaining propellant allows the satellite station keeping and attitude control system to adjust the position and attitude of the satellite even if the thrusters can no longer provide a thrust by chemical combustion; the longevity of the satellite is thus extended. The invention can effectively extend the operation of a typical communications satellite by several months.

These and other features and advantages of the invention will be apparent to those skilled in the art from the following detailed description, taken together with the accompanying drawings, in which:

DETAILED DESCRIPTION OF THE INVENTION

The invention provides a propulsive force for a satellite with a controlled release of only one propellant species without combustion to adjust the attitude and/or position of a satellite. When only one of the propellant species is left near the end of the satellite's useful life, the controlled thrust generated by one of the propellants allows the satellite station keeping and attitude control system to adjust the position and attitude of the satellite even if the thrusters can no longer provide a thrust by chemical combustion.

Figure 1:
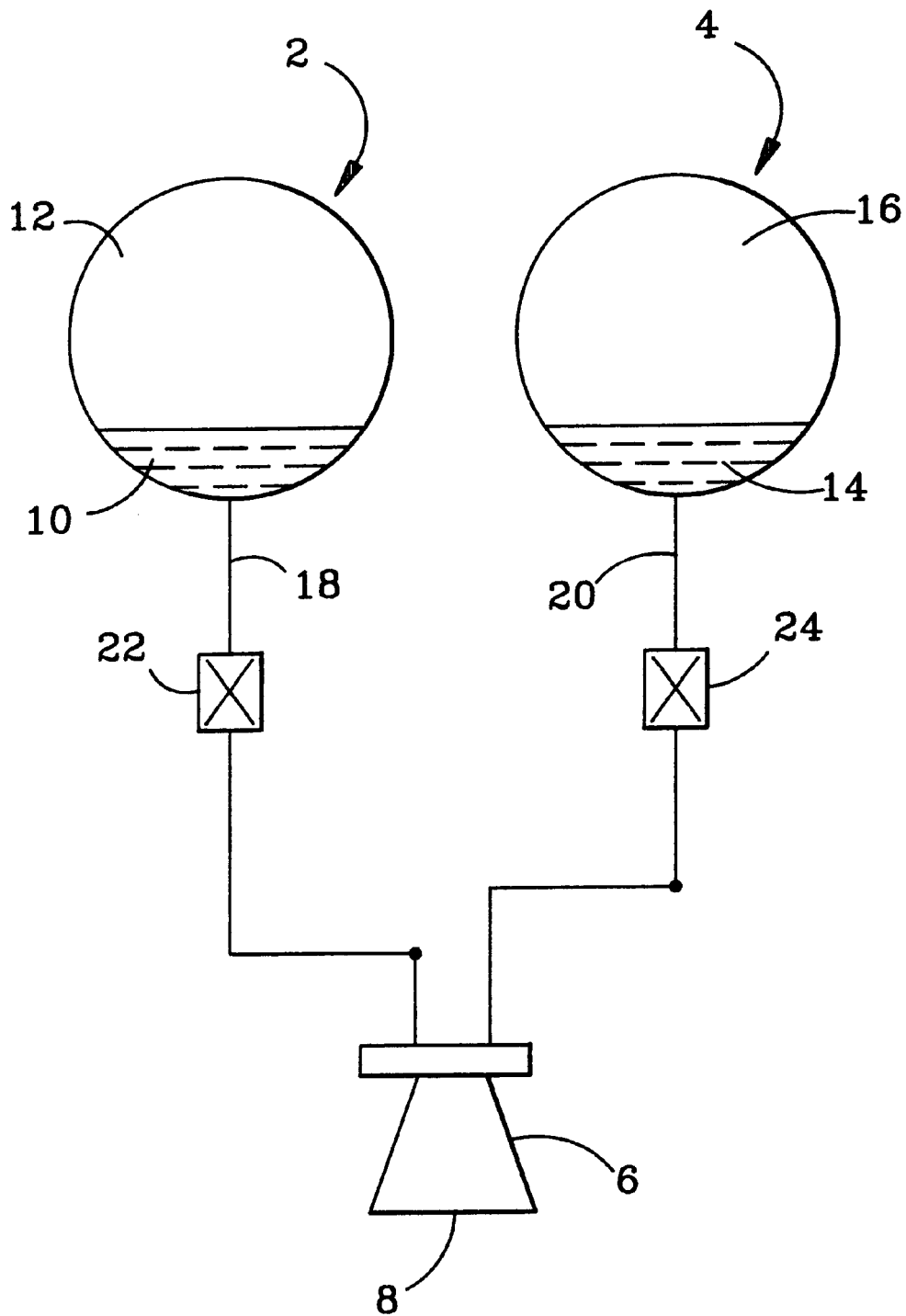
FIG. 1, described above, is a simplified diagram of a bipropellant thruster rocket propulsion system.
Figure 2:
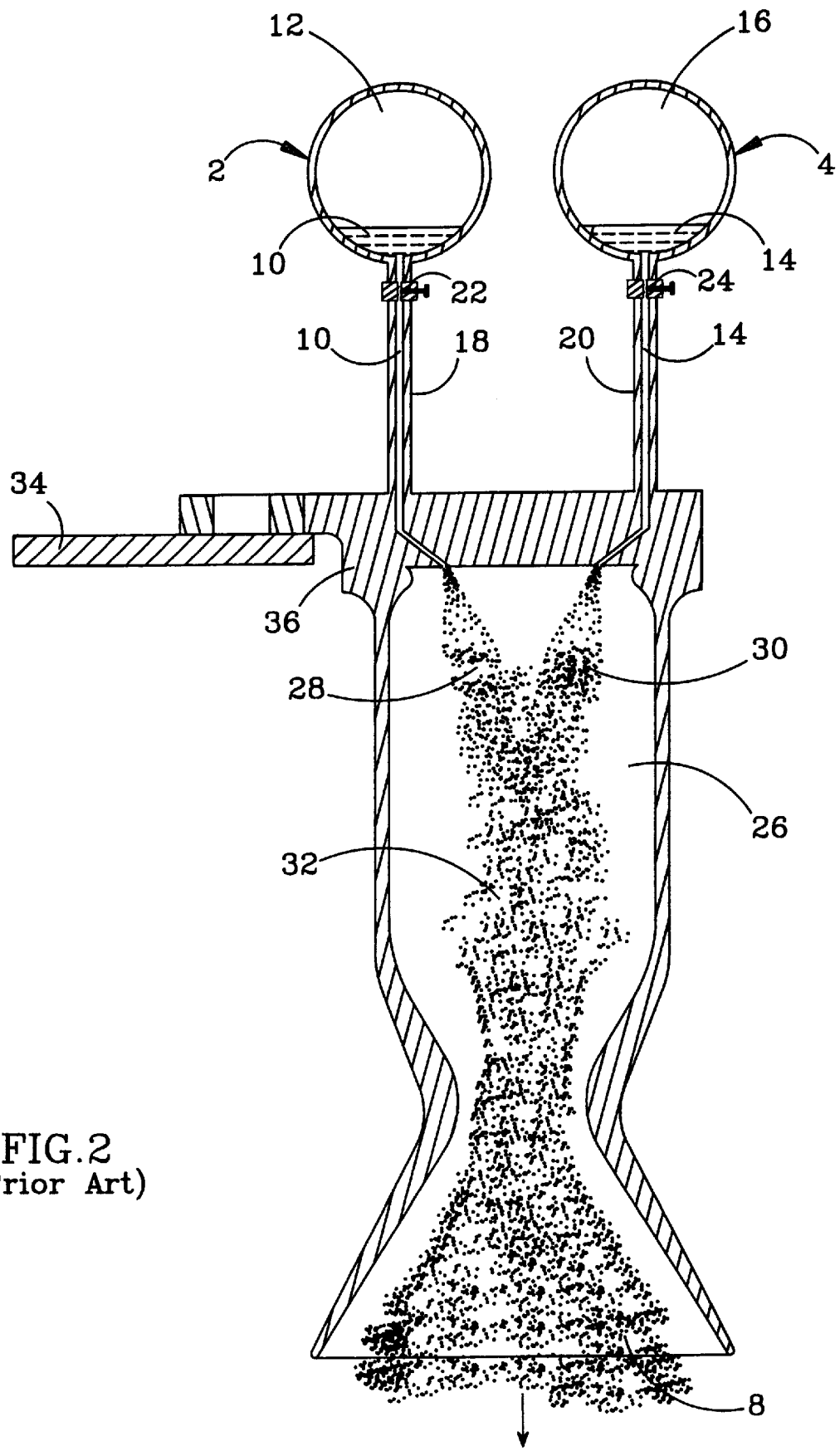
FIG. 2, described above, is a simplified sectional view of a bipropellant thruster rocket showing the conventional generation of a thrust force by combustion.
Figure 3A:
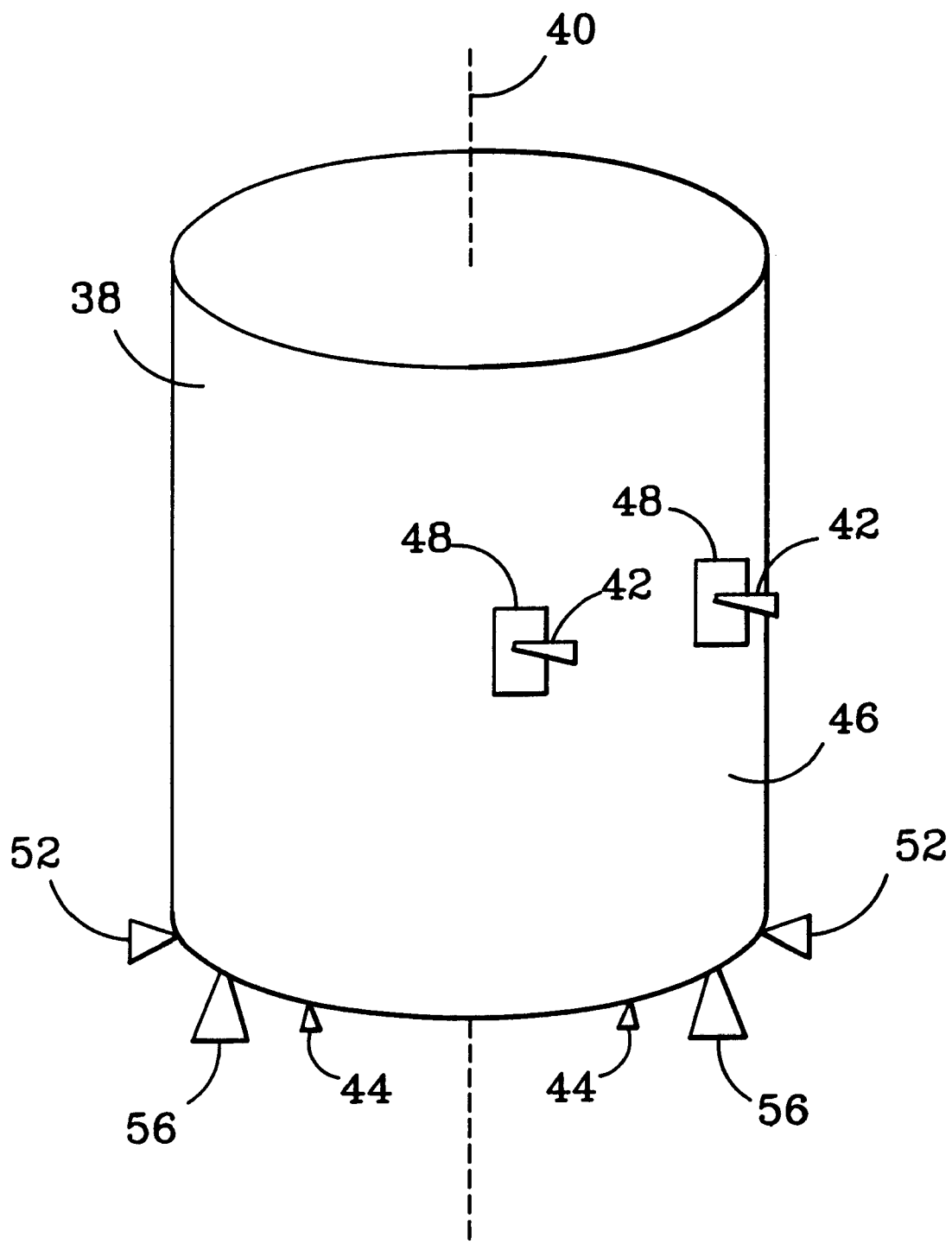
FIG. 3a, described above, is a simplified perspective view of a conventional Hughes HS-393 communications satellite with a plurality of station keeping and attitude control thrusters.
Figure 3B:
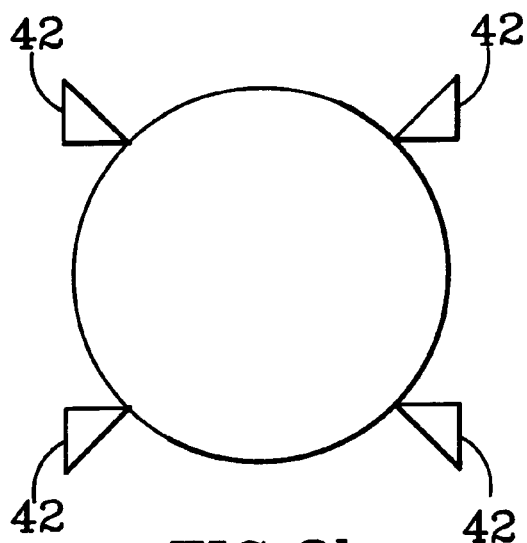
FIG. 3b, described above, is a simplified top view of the HS-393 satellite with four axial thrusters.
Figure 3C:
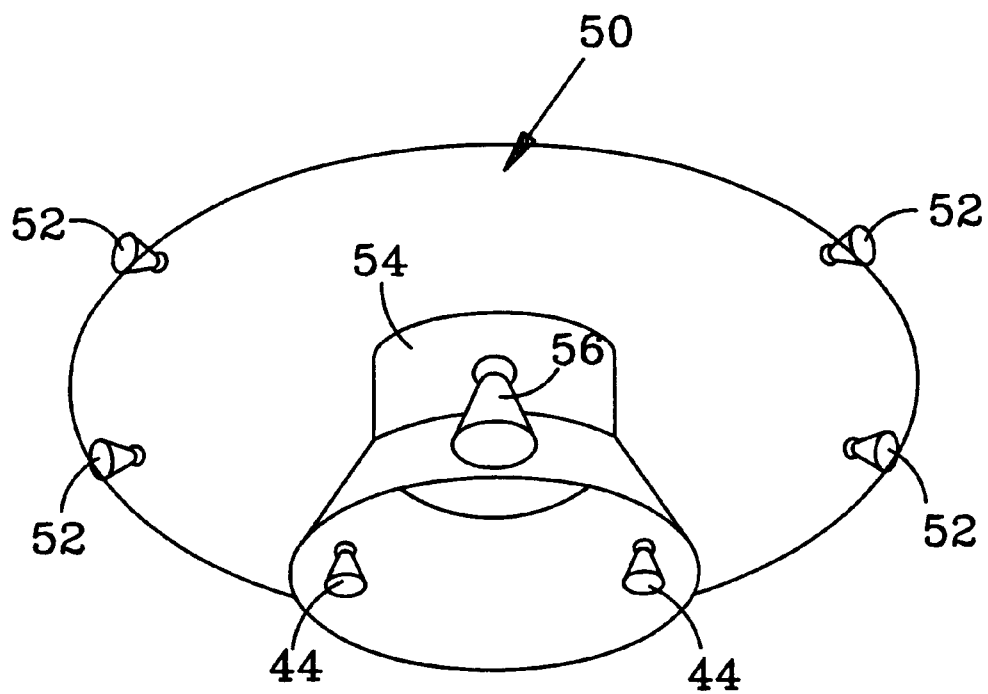
FIG. 3c, described above, is a perspective view of the bottom spun shelf of the HS-393 satellite.
Figure 4:
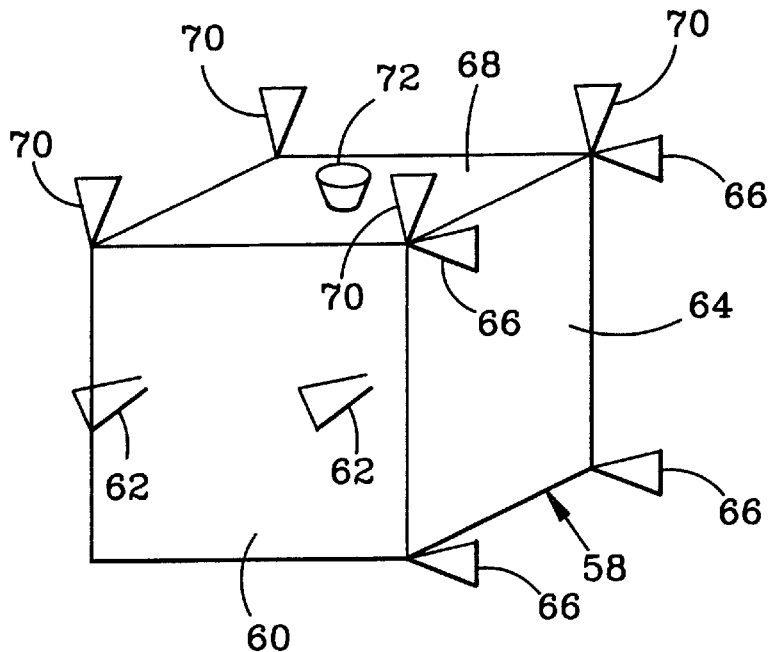
FIG. 4, described above, is a simplified perspective view of a conventional Hughes HS-601 communications satellite with a plurality of station keeping and attitude control thrusters.
Figure 5:
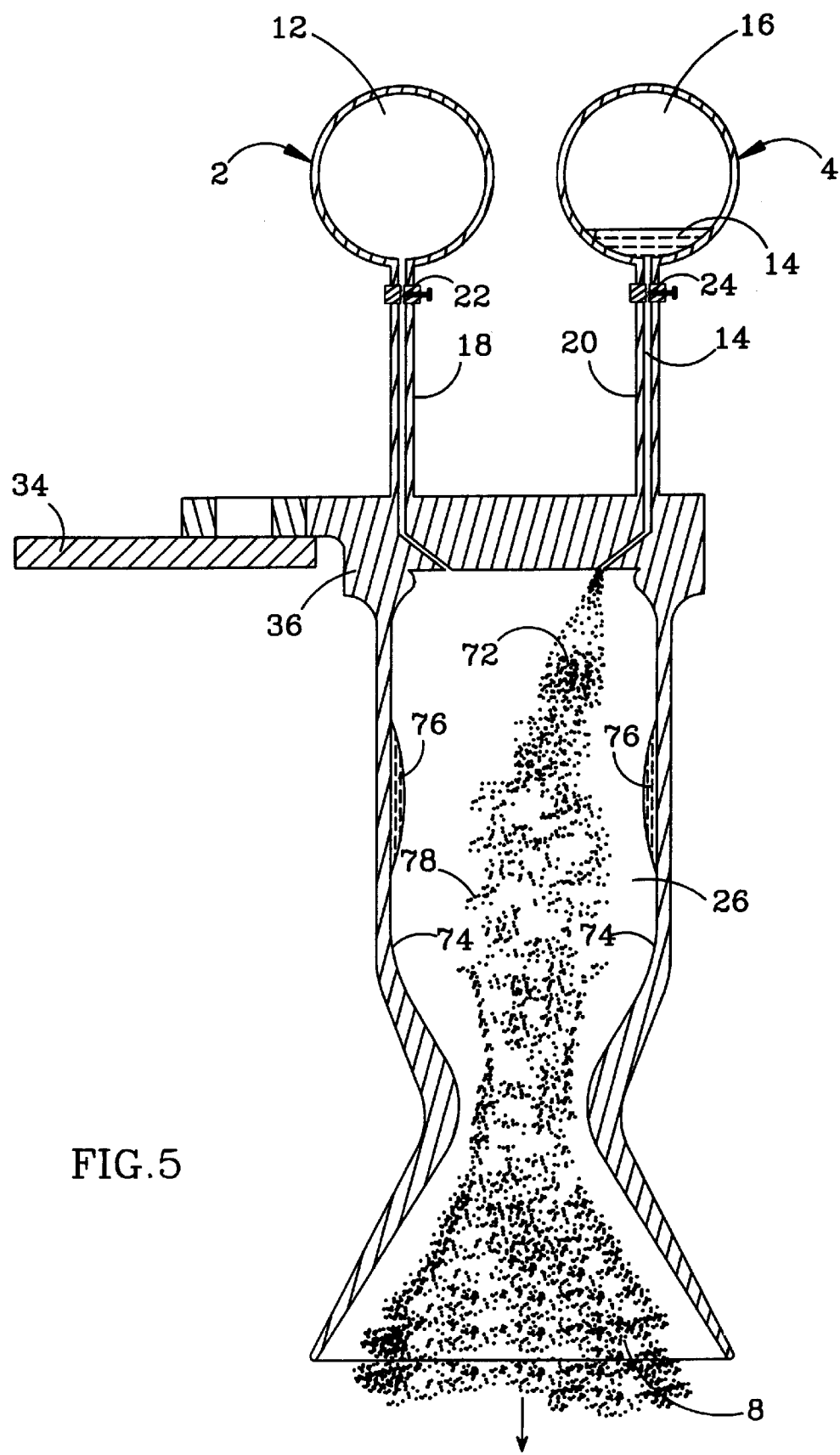
FIG. 5 is a simplified sectional view of a bipropellant thruster rocket showing the generation of a thrust force by only one of the propellants in accordance with the invention.

A preferred embodiment of the invention is described below. Although the embodiment concerns attitude control and station keeping of an HS-393 geosynchronous communications satellite, the invention is also applicable to the attitude control and station keeping of other types of spacecraft and/or other orbits. The process is illustrated in FIG. 5, which is a simplified sectional view of a thruster rocket similar to FIG. 2 and uses the same reference numbers as in FIG. 2 for the same elements, with the exception that a propellant remains in only one of the tanks while the other tank is empty of the complementary propellant. The determination of whether a tank is empty is performed by a conventional on-board propellant measurement system which is well known to a person skilled in the art. The remaining propellant, which is preferably liquid, can be either an oxidizer 14 or a fuel, and is injected as a liquid 72 into the thruster chamber 26. Although FIG. 5 illustrates the use of an oxidizer as the single propellant species to produce a thrust, the invention is also applicable to the use of a liquid fuel without the oxidizer as a complementary propellant.

The liquid oxidizer from tank 4 hits the inner wall 74 of the thruster chamber 26, and may be slightly disturbed if helium gas or vapor 12 remaining in the fuel tank 2 which is depleted of fuel also enters the thrust chamber. The liquid 76 on the wall evaporates due to the vacuum of space and the warmth of the combustion chamber. The vapor pressures of the liquids are heavily dependent upon the temperature. Therefore, it is preferred that the heater plate 34 heat the combustion chamber by conducting the heat through the metal wall 36 to keep the liquid oxidizer above the freezing point. This heating also provides for a high rate of oxidizer evaporation. Even if the thrust chamber is not heated, the oxidizer can still be evaporated albeit at a slower rate, as long as the liquid oxidizer remains above the freezing point. The oxidizer vapor 78 generates a vapor pressure which ejects the vapor out of the nozzle 8, thereby producing a thrust force. For operating conditions typical of many spacecraft, it is possible to obtain a sufficient propulsive force by injecting one propellant into the thrust chamber in a number of carefully controlled short pulses. The isolation valves 22, 24 control the rate of fluid flow into the thruster chamber, and are opened or closed with precise timing to control the generation of the pulsed thrust force. The valves can be controlled by a conventional on-board thrust control system or by conventional remote control via a telemetry link from a ground station, both methods of which are known to a person skilled in the art. Therefore, the spacecraft maneuver life can be extended beyond the depletion of one propellant species.

Figure 6:
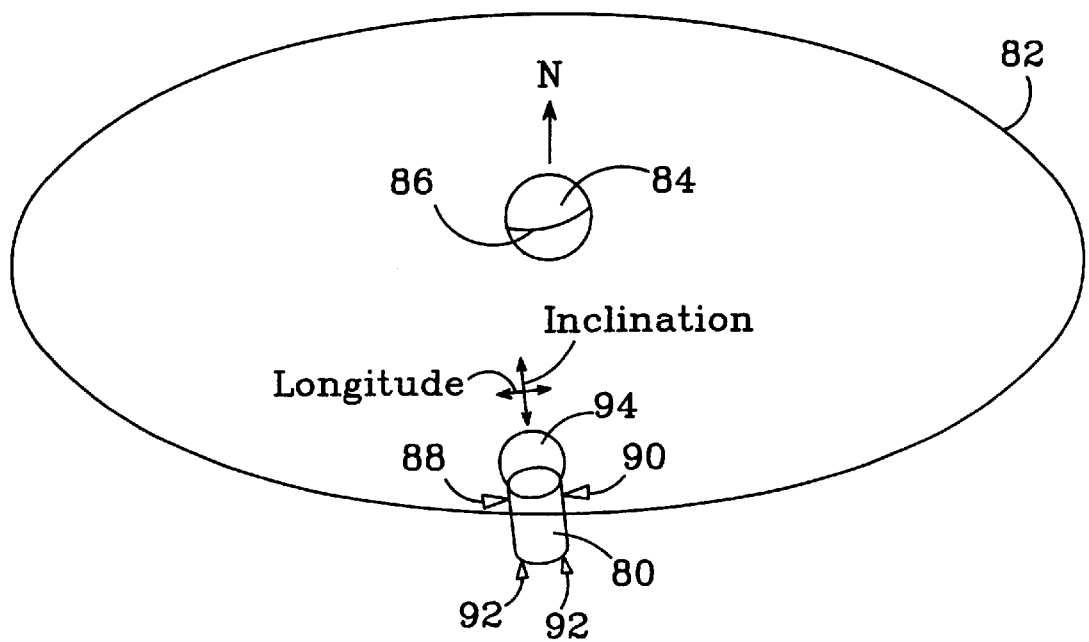
FIG. 6 is a diagram of an HS-393 satellite in a geosynchronous orbit with canted radial and axial thrusters to adjust the satellite's position.

FIG. 6 shows an example of a Hughes HS-393 communications satellite 80 in a geosynchronous orbit 82 around the earth 84. The orbit is directly above the earth's equator 86, and the north pole is shown as an arrow N. To illustrate the longitudinal (east/west) positioning of the satellite by its canted radial thrusters, FIG. 6 shows only two thrusters 88 and 90 which are positioned for propelling the satellite to the east and west, respectively. The inclination (north/south) of the satellite can be adjusted by the axial or apogee thrusters 92. For illustrative purposes only, an external antenna 94 is positioned on the satellite opposite the apogee thrusters. In a preferred embodiment that is particularly applicable to the JCSAT-1 described above, a small inclination bias is initially applied to the satellite in November or December, and the satellite drifts in inclination from +0.06° to −0.06°. This drift is due to natural orbital mechanics; no rocket propellant is required for inclination control. While drifting within the ±0.06° inclination, and assuming that the propellant in one of the tanks has been exhausted, longitudinal control is performed by one of the thrusters 88, 90, which generates thrust forces by vaporization of the remaining propellant species.

It is preferred that the thrust forces be generated in pulses. For example, a pulse duration of about 15 ms with a pulse repetition period of about 14 seconds for 133 minutes every two weeks provides a sufficient force for east/west adjustment. The drifting from +0.06° to −0.06° inclination provides approximately 57 days of additional maneuver life.

After the satellite completes its drifting period, its inclination is then held constant by either the axial thrusters or the apogee thrusters 92. In one embodiment, assuming that the oxidizer remains after the fuel has been expended, the apogee thrusters eject an oxidizer vapor in periodic pulses of about 0.1 second with a pulse repetition period of about 4 minutes for an average of about 2.6 hours per day. This pulsing of apogee thrusters to hold the inclination can extend the maneuver life by approximately three months in addition to the extended life achieved by the ±0.06° inclination drift.

At the end of its useful life, the satellite is deorbited to vacate its position in the geosynchronous orbit for future satellites. A thrust force must be provided for pushing the satellite out of the geosynchronous orbit. A velocity of about 3.81 m/s is generally required to move the satellite orbit approximately 180 km above the geosynchronous altitude. If only a single propellant species is left to deorbit the satellite, about 4.9 kg mass of oxidizer vapor and/or helium gas needs to be used to propel the satellite out of the geosynchronous orbit.

The described inclination drift with longitudinal control followed by the inclination hold extends the useful life of the satellite by almost five months. It is only one illustrative embodiment of the invention; with more drifting and more remaining propellant, the satellite's longevity can be extended even further.

While illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method for controlling the position or the attitude of a spacecraft, comprising:
   providing at least one position or attitude control rocket for the spacecraft that requires at least two propellants to produce a thrust force by combustion;
   determining that a supply of one of said propellants is empty; and
   in response to said determination releasing a remaining one of said propellants from said rocket at a precisely controlled rate to provide a propulsive force on the spacecraft.

2. The method of claim 1, wherein said remaining propellant comprises a liquid propellant, further comprising the step of vaporizing said propellant to form a propellant vapor before releasing said propellant to provide said propulsive force.

3. The method of claim 2, wherein said remaining propellant comprises an oxidizer.

4. The method of claim 2, wherein said remaining propellant comprises a fuel.

5. The method of claim 1, wherein said rocket includes a thrust chamber, and said remaining propellant is released from said rocket by releasing it into said thrust chamber, vaporizing it within said thrust chamber to form a propellant vapor, and releasing said propellant vapor from said thrust chamber to provide said propulsive force.

6. The method of claim 5, wherein said rocket further includes a plurality of propellant tanks with said propellants stored in respective ones of said tanks, further comprising the step of controlling the flow rate of said remaining propellant into said thrust chamber from its tank to control the rate of propellant vaporization.

7. The method of claim 5, wherein said remaining propellant is vaporized by heating it in said thrust chamber.

8. The method of claim 1, wherein said remaining propellant is released in a plural controlled with precisely controlled pulse durations and pulse repetition periods.

9. The method of claim 1, wherein said remaining propellant is released through a plurality of said rockets to adjust the position or attitude of the spacecraft.

10. The method of claim 9, wherein said spacecraft orbits the earth in a substantially geosynchronous orbit, and said rockets release said remaining propellant to control the inclination of the spacecraft.

11. The method of claim 9, further comprising the step of drifting the inclination of said spacecraft between about +0.06 degree and about −0.06 degree.

12. The method of claim 9, wherein said spacecraft orbits the earth in a substantially geosynchronous orbit, and said remaining propellant is released through said rockets to maneuver the spacecraft to a desired longitude.

13. The method of claim 12, wherein said remaining propellant is released through said rockets to hold the spacecraft at a constant inclination while maneuvering to said longitude.

14. A spacecraft attitude and position control method for use near the end of a spacecraft's useful life with one propellant remaining in a propellant tank for a spacecraft thruster rocket, and another propellant tank for said thruster rocket empty, comprising:
   determining that said other propellant tank is empty;
   in response to said determination, injecting said remaining propellant into the thrust chamber of said thruster rocket;
   converting said remaining propellant into a gaseous form; and
   releasing said remaining propellant from said thrust chamber at a precisely controlled rate to provide a propulsive force on the spacecraft.

15. The method of claim 14, wherein said remaining propellant comprises an oxidizer.

16. The method of claim 14, wherein said remaining propellant comprises a fuel.

17. The method of claim 14, wherein said remaining propellant comprises a liquid, and said liquid is converted to said gaseous form by vaporizing it in said thrust chamber.

18. The method of claim 14, further comprising controlling the flow rate of said remaining propellant into said thrust chamber to control the rate of propellant vaporization.

19. The method of claim 14, wherein said remaining propellant is released in a plurality of pulses with precisely controlled pulse durations and pulse repetition periods.

20. The method of claim 14, wherein said spacecraft orbits the earth in a substantially geosynchronous orbit, and said remaining propellant is released through said rocket to control the inclination of said spacecraft.

21. The method of claim 14, further comprising the step of drifting the inclination of said spacecraft between about +0.06 degree and about −0.06 degree.

22. The method of claim 14, wherein said spacecraft orbits the earth in a substantially geosynchronous orbit, and said remaining propellant is released through said rocket to maneuver said spacecraft to a desired longitude.

23. The method of claim 22, wherein said remaining propellant is released through said rocket to hold said spacecraft at a constant inclination while maneuvering to said longitude.

* * * * *